Nov. 20, 1962

J. G. FERGUSON 3,065,413

MAGNETIC GRADIOMETER SYSTEM

Filed Sept. 29, 1945

INVENTOR
J. G. FERGUSON
BY
Walter M. Hill
ATTORNEY

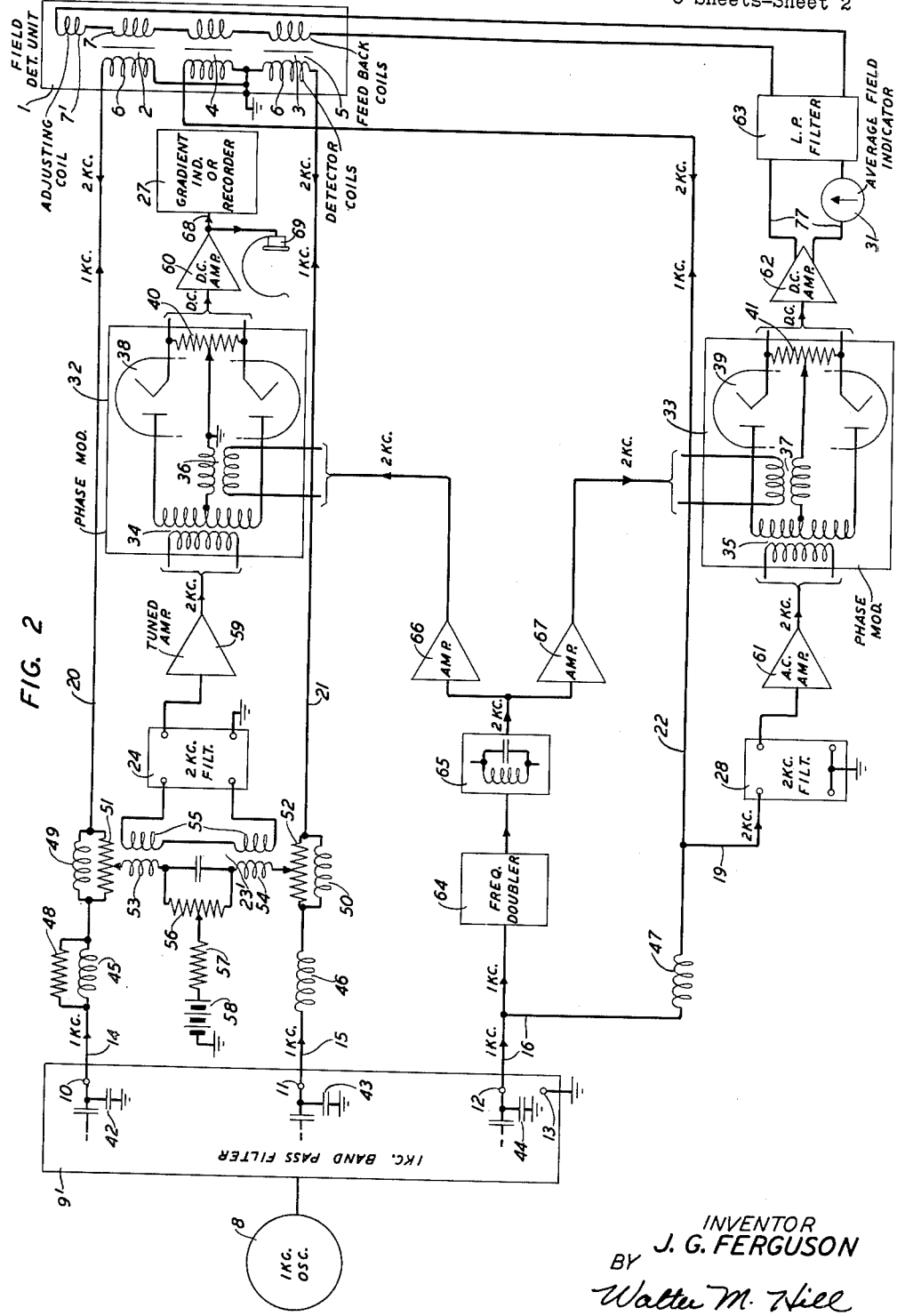

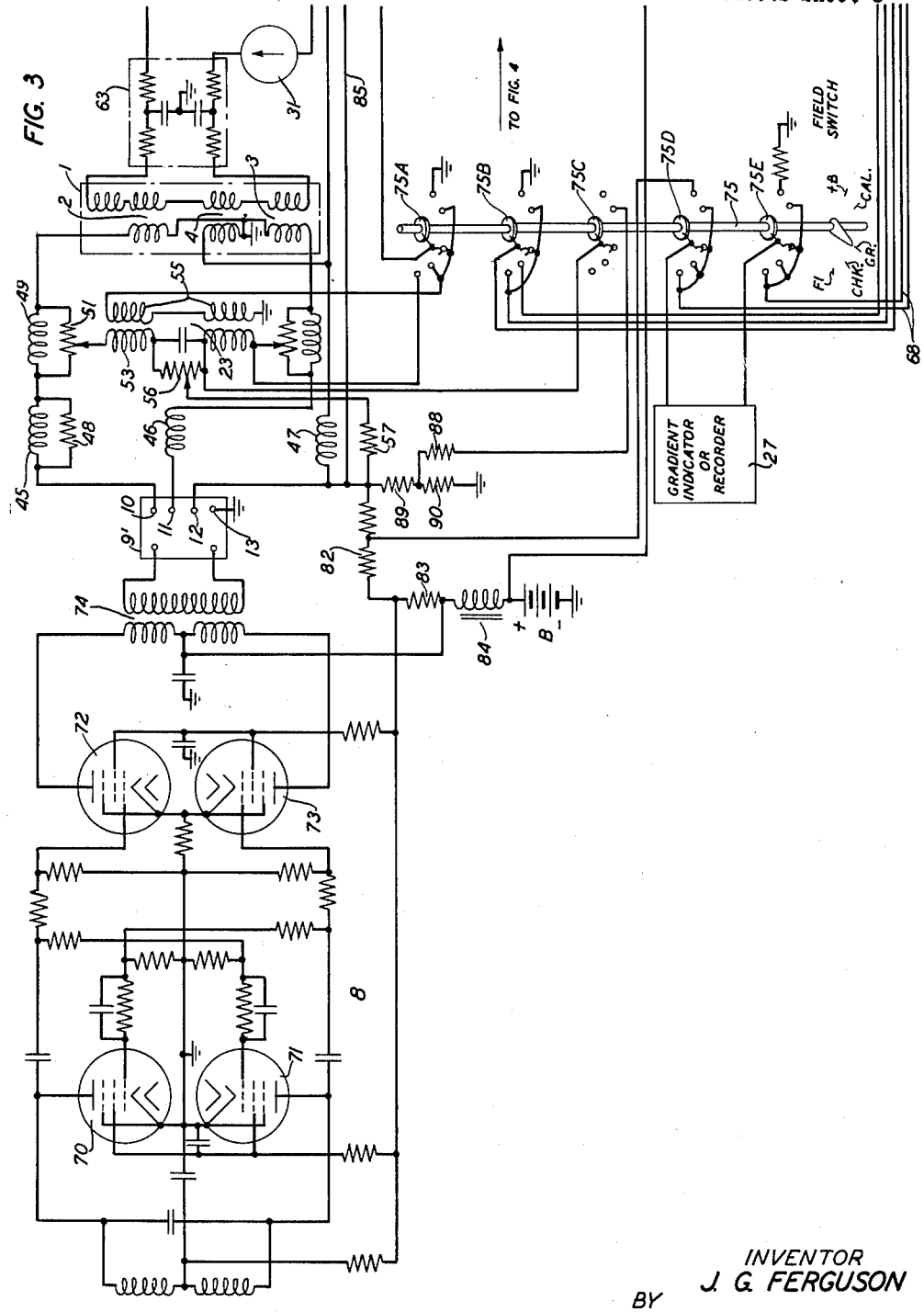

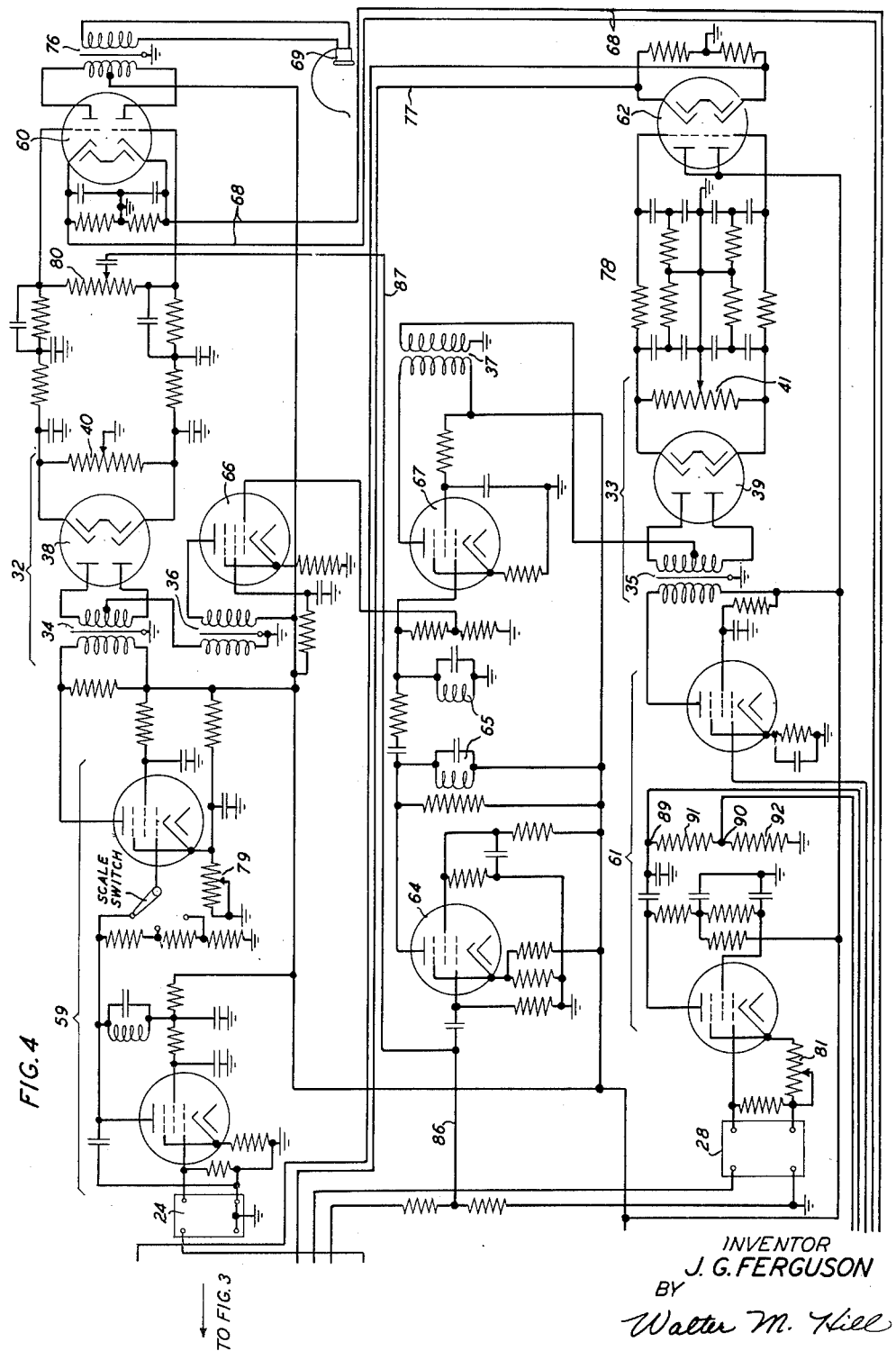

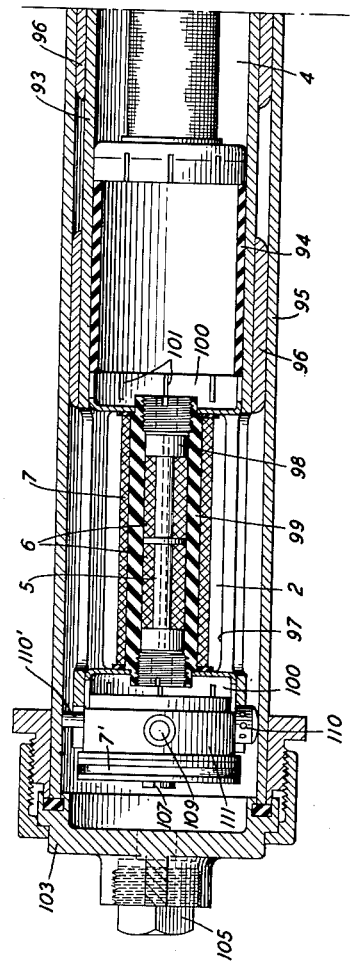
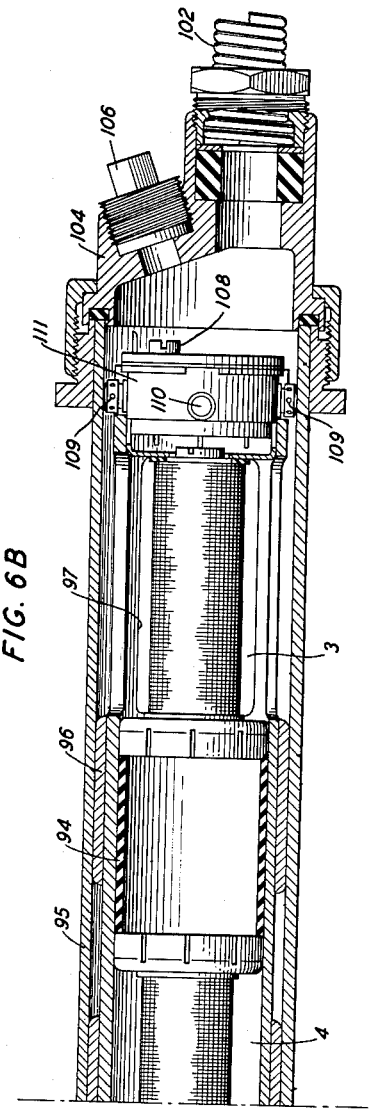

Nov. 20, 1962     J. G. FERGUSON     3,065,413
MAGNETIC GRADIOMETER SYSTEM
Filed Sept. 29, 1945     6 Sheets-Sheet 6
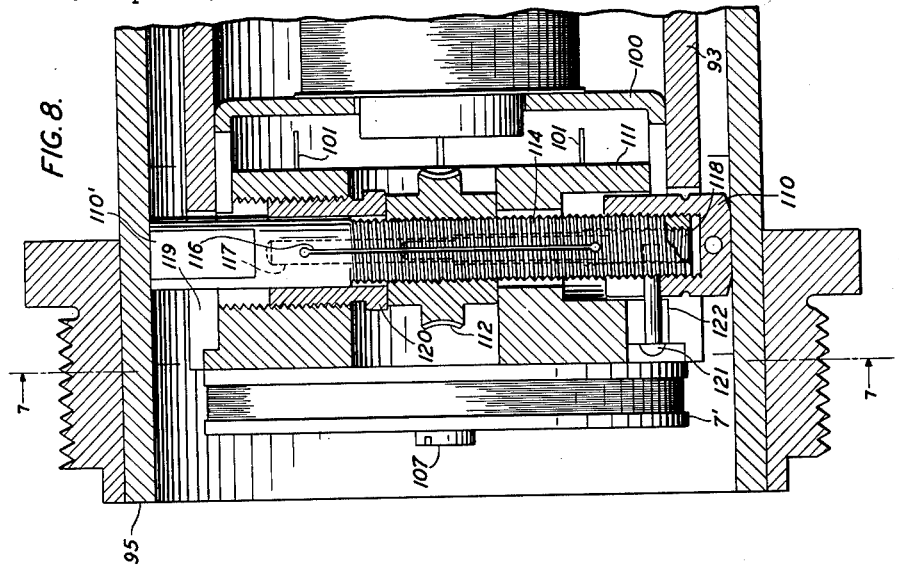
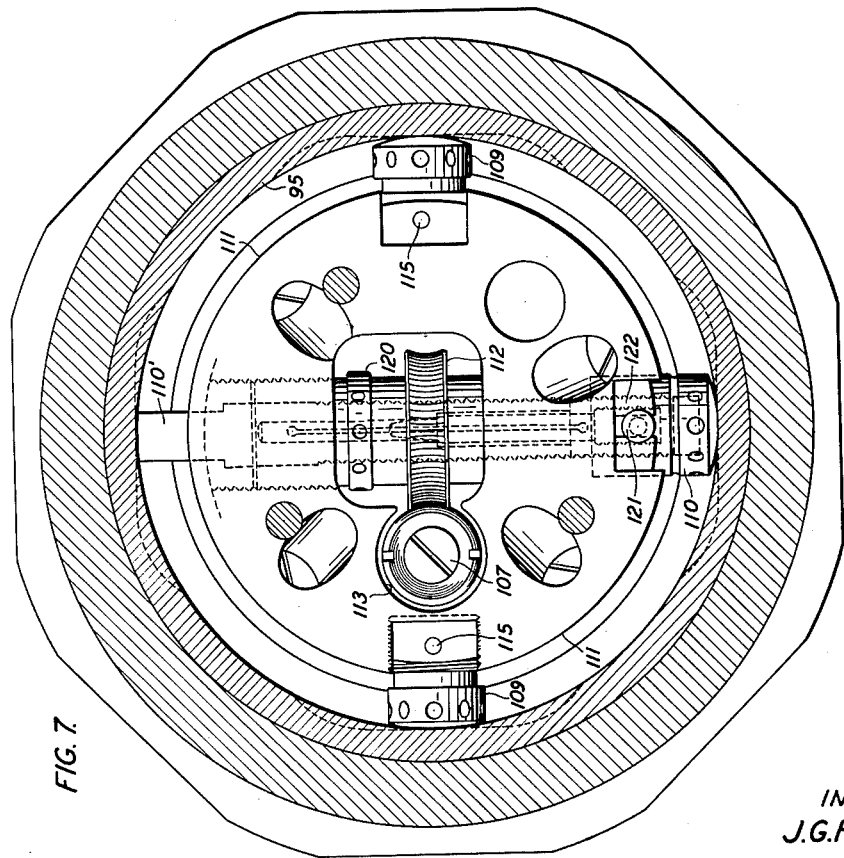
INVENTOR
J.G. FERGUSON
BY
Walter M. Hill
ATTORNEY United States Patent Office 3,065,413
Patented Nov. 20, 1962

3,065,413
MAGNETIC GRADIOMETER SYSTEM
John G. Ferguson, Montclair, N.J., assignor to Bell Telephone Laboratories, Incorporated, New York, N.Y., a corporation of New York
Filed Sept. 29, 1945, Ser. No. 619,397
1 Claim. (Cl. 324—43)

This invention relates to magnetic detection systems and more particularly to a magnetic gradiometer system responsive to the difference in magnetic field intensity between two points in space. This application is a continuation in part of my original application Serial No. 549,872, filed August 17, 1944.

Magnetic field measurements, especially in the study of terrestrial magnetism, may comprise measurements of the horizontal field intensity, the vertical field intensity, the angles of inclination and declination, measurements of the total field intensity and measurements of field gradient. In the measurement of the field gradient, it is sometimes desirable to know only the absolute value of the gradient along a particular axis. In other applications it is necessary that not only the absolute value of the field gradient be known but also its alegbraic sign, that is the direction in which the field is increasing or decreasing along the specified axis. Either the direction of increasing or the direction of decreasing field may be regarded as having the positive alegbraic sign, the other direction being regarded as negative.

It is the object of this invention to provide a magnetic gradiometer system of great sensitivity, capable of indicating either the absolute value of a small field gradient or both its magnitude and its direction or algebraic sign, the system also being adapted for indicating the average intensity of the field component taken along the axis where the field gradient measurement is made.

The foregoing object is attained by this invention by providing a gradiometer system comprising three magnetometer elements each comprising a length of magnetic material with windings thereon, means supporting said magnetometers in fixed spaced relation with their principal axes aligned to substantial parallelism, a source of alternating current of fundamental frequency for energizing the windings on all three magnetometers whereby even order harmonic voltages are generated in each of said windings of magnitudes proportional to the magnitude of the magnetic component in the direction of their respective principal axes, a circuit connecting windings of two of the magnetometers in effective series opposition with respect to a selected one of the even order harmonic voltages generated therein, an indicating means connected to the series opposition circuit responsive to the difference between said selected even order harmonic voltages, whereby the field gradient between the two magnetometers is indicated, a rectifier means connected to the third magnetometer and responsive to one selected even order harmonic voltage generated therein, a circuit connecting the direct current output from the rectifier means in series with at least one of the windings on the three magnetometers and in magnetic polarity to oppose at each magnetometer the magnetic field component to be measured.

The invention may be better understood by referring to the accompanying drawings in which:

FIG. 1 discloses a block schematic of one embodiment of this invention adapted for indicating the absolute magnitude of the field gradient in a particular direction;

FIG. 2 is another block schematic diagram disclosing a different embodiment of the invention adapted for indicating not only the magnitude of the field gradient but also its algebraic sign;

FIGS. 3 and 4 are more detailed circuit diagrams of the circuits employed in the gradiometer system of FIG. 2; and FIGS. 5 to 8 inclusive, show various views of the mechanical assembly of the gradiometer field detector unit.

Figure 1:
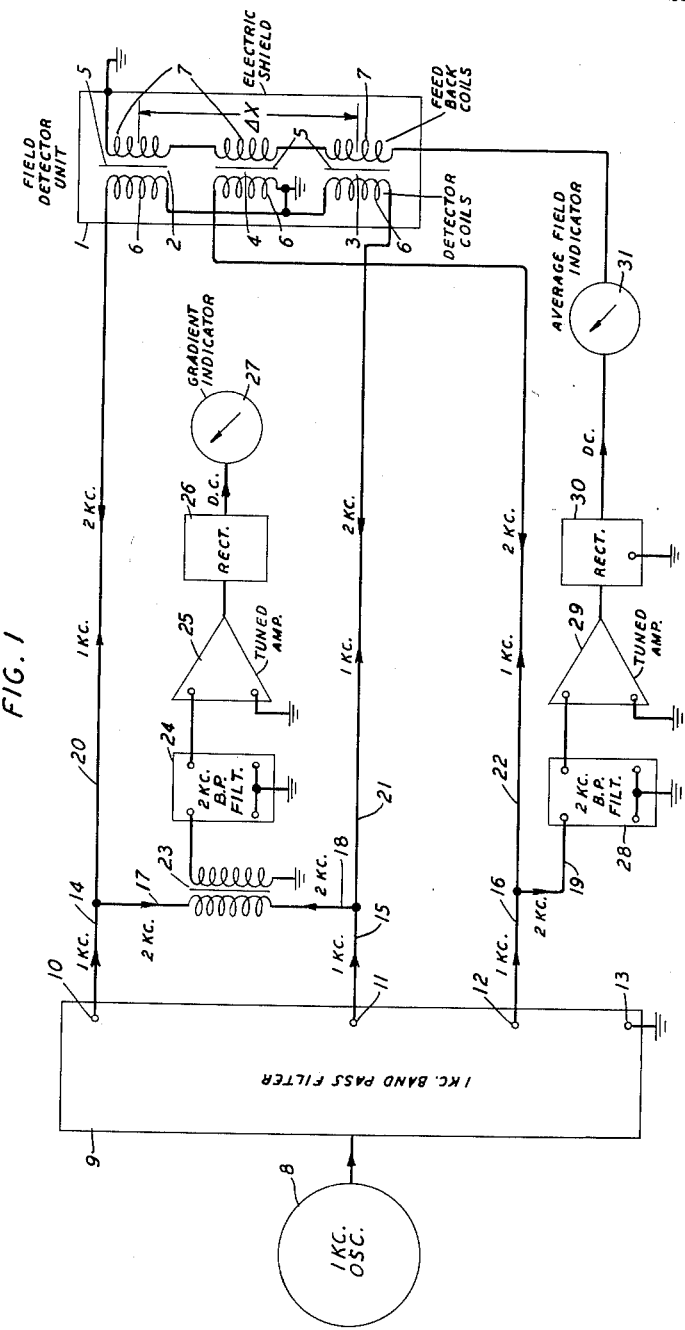

Referring now more particularly to FIG. 1, there is shown a field detector unit denoted generally by the reference numeral 1. This detector unit comprises two gradiometer detector units 2 and 3 and an average field detector unit 4. Each of these units comprises a core 5 of magnetic material having wound thereon a detector coil 6 and a feedback coil 7. The detector coil is preferably wound around the core and this wound unit is inserted inside the feedback coil. This will be more particularly described later in connection with FIG. 6A. The two gradiometer units or magnetometers 2 and 3 are preferably spaced apart a known fixed distance between their magnetic centers which distance is denoted $\Delta X$ on FIG. 1. It will be obvious that should the gradiometer units 2 and 3 be equally sensitive to a field of the same intensity, the difference in response between these two elements when placed in a uniform field would be zero. It is equally obvious that if the magnetic field is different they will have unequal responses so that their difference in response will not be zero. The difference in field intensity at the two gradiometers may be denoted by the symbol $\Delta H$. The magnetic field gradient is then expressed by the ratio $\Delta H/\Delta X$ and as the response of the two gradiometers will differ in proportion to the field difference $\Delta H$ the difference in response is a measure of the gradient. The manner in which these gradiometer units respond to the magnetic field component will be more particularly described later.

Collinearly with the gradiometer-detector units 2 and 3 and preferably intermediate therebetween is the average field detector unit 4. This unit is preferably located so that its magnetic center is equidistant from the magnetic centers of the gradiometer detector units 2 and 3. Since the field component at this point is substantially equal to the average of the field components existing at the gradiometer-detector units 2 and 3, it is obvious that the response of this element would be proportional to the average field component acting in the direction of their common principal axis.

The three detector units 2, 3 and 4 are substantially identical in their construction. As previously stated each of them contain a magnetic core 5 upon which the windings 6 and 7 are wound. One of the windings on each of the detector units is used for energizing the magnetometer unit with a current of fundamental frequency. In gradiometer-detector unit 2, winding 6 is used for this purpose and if a current of fundamental frequency is passed through this winding of sufficient magnitude to drive the magnetization in core 5 near saturation even order harmonic voltages will appear across windings 6 and 7 proportional in magnitude to any constant component of the magnetic field which may be acting in the direction of the principal axis of the magnetic core. Actually both even and odd order harmonics are generated in all windings surrounding the core including the winding used for energizing the core. The production of harmonics is due to the curvature of the magnetization curve and therefore the core is excited close to saturation. For any given value of external field, the output of any single even order harmonic increases rapidly as the exciting voltage is increased until the knee of the curve is reached and reaches a rather broad maximum as the exciting voltage is further increased, the value of maximum output being a function of the order of the harmonic. The harmonic output voltage is approximately proportional to the signal field provided that the signal field is within the linear portion of the magnetization curve of the core. These relationships may be expressed by the following mathematical equations:

$$V_o \doteq KH.f(E) \qquad (1)$$

$V_o$ is the generated output voltage of any selected even order harmonic.

K is a constant depending upon the core material, its dimensions and the harmonic order selected.

H is the strength of the signal field component in the direction of the principal axis of the core.

$f(E)$ is a function of the driving voltage E as it relates to a particular magnetometer design.

As previously stated these even order harmonic voltages are generated in each and every winding surrounding the magnetometer core, as for example, windings 6 and 7 which surround core 5. It is obvious that additional windings may also be employed in which any one or more windings may be utilized for exciting the magnetometer while the others may be used for detecting different ones of the even order harmonics. In FIG. 1, winding 7 is actually employed as a compensating winding to reduce the amount of field affecting the core 5, the amount of reduction being in proportion to the strength of the average field component. The manner in which this is done will be described in greater detail later. Instead of using a separate winding for picking up the generated even order harmonics, winding 6 is used for both energizing the magnetometer 2 and also as the pick-up winding for detecting the generated even order harmonics.

The voltage used for exciting the magnetometer may be of any convenient frequency as for example 1 kilocycle. In FIG. 1 the source of this frequency is the 1 kilocycle oscillator 8 which passes current to the exciting windings of the magnetometers through a 1 kilocycle band-pass filter 9. The output of this filter is taken from terminals 10, 11 and 12, the common return to the filter being the ground terminal 13. Band-pass filter 9 may be of any of the well-known band-pass filter types and is designed to have three output channels feeding the three terminals 10, 11 and 12, respectively. Current from terminal 10 passes over lines 14 and 20 to the detector energizing coil 6 of magnetometer 2 and thence back to the ground terminal 13 through an obvious circuit including ground. The energizing coil of gradiometer unit 3 is energized over a similar circuit from filter terminal 11 by way of conductors 15 and 21 and back through ground to terminal 13 of the filter. Likewise a similar circuit to the average field detector 4 starts from terminal 12 of the filter over conductors 16 and 22 through the exciting winding and back to terminal 13 of the filter by way of ground. Reference arrows on conductors 20, 21 and 22 labeled "1 K.C." indicate the passage of these energizing currents.

These energizing coils, as for example coil 6 for magnetometer 2 are also used as pick-up coils for the even order harmonic voltages generated in these magnetometers. For illustrative purposes the second harmonic of two kilocycles may be selected, the flow of this current being represented by an arrow labeled "2 K.C." on conductors 20, 21 and 22, respectively. Gradiometer-magnetometers 2 and 3 are connected so that the second harmonics generated therein are in opposite phase with respect to the series circuit formed by their pick-up coils and the primary winding of transformer 23. Consequently, no second harmonic current will actually flow through this series circuit unless one of the voltages becomes larger than the other. With no current flowing, obviously there will be no voltage generated in the windings of transformer 23 and consequently there will be no current in the secondary of this transformer. However should the field components be unequal at the two gradiometer-magnetometers 2 and 3, the second harmonic voltages generated in their windings will be unequal which will result in a second harmonic current of two kilocycles flowing through the primary winding of transformer 23. The primary winding of transformer 23 is connected to conductor 20 by way of conductor 17 and conductor 21 by way of conductor 18 so that the series circuit just referred to is easily traced from the lower end of the primary of transformer 23 through conductor 18, conductor 21 through the exciting pick-up winding of magnetometer 3, through the exciting pick-up coil of magnetometer 2 through conductors 20 and 17 and back to the primary winding of transformer 23. When the absolute magnitude of the field gradient at the field detector unit becomes greater than zero, this second harmonic current will flow through the primary of transformer 23 thereby generating a voltage across its secondary. This voltage produces a current which passes through a 2 kilocycle band-pass filter 24, is amplified by a tuned amplifier 25, rectified by a rectifier 26 and applied to a gradient indicator 27. The gradient indicator may be any suitable direct current indicating instrument or in the alternative may be a recorder responsive to the direct current from the rectifier 26.

The description thus far of the detector circuit operation neglects the effect of the average field detector magnetometer 4. Without this unit, precision measurements of small field gradients would be very difficult if not impossible from a practical point of view. This magnetometer 4 is preferably located midway between the magnetic centers of gradiometer-magnetometers 2 and 3 and is excited from terminal 12 of band-pass filter 9 by way of conductors 16 and 22 through the exciting coil and back to the grounded terminal 13 of the band-pass filter 9. Due to the location of this magnetometer the second harmonic voltages generated therein will be proportional to the average field component existing between the two gradiometer units 2 and 3. The second harmonic voltage of two kilocycles generated therein in response to this average field will be carried over conductor 22 and through conductor 19 to the two kilocycle band-pass filter 28. The output from filter 28 is amplified by the tuned amplifier 29, is rectified by rectifier 30 and the direct current output of this rectifier is passed through an average field indicator 31 and through the three feedback coils 7, 7, 7 of the field detector unit. The return path from the feedback coils is by way of ground through an obvious circuit. The average field indicator 31 may be a direct current instrument similar to the gradient indicator 27. Since as already indicated the second harmonic voltage output from the average field detector 4 is proportional to the average field intensity, the current output from rectifier 30 also varies in proportion to the strength of this average field and consequently the average field indicator 31 may be calibrated in proportion to the average field intensity. As this current also passes through the three feedback coils 7, 7, 7 in the field detector unit it provides a neutralizing or compensating effect.

This neutralizing effect is secured by having the feedback coils produce a magnetomotive force acting in direct opposition to the field being measured. In order for this to work properly, it is essential that the feedback coils, 7, 7 of the gradiometer units 2 and 3 be exactly alike to a very high degree of precision. It should be remembered that this neutralizing current is proportional to the average field component since the direct current used for energizing these coils is derived from the second harmonic generated in the average field magnetometer 4. Consequently, if the average field changes, the neutralizing effect from the feedback coils 7 will correspondingly change. The advantages realized in using these feedback coils is better understood by considering that without the feedback coils it would be necessary to make the pick-up windings in the gradiometer units 2 and 3 exactly alike to within at least one part in one hundred thousand in order to have the detector operate with an error of less than one gamma in a uniform field of 1 gauss in the direction of the common axis of the field detector unit. This requirement is much more easily met in a practical system by utilizing the feedback coils to compensate or neutralize the greater part of the field acting on the gradiometer unit and since this feedback magnetomotive force is exactly equal for each of these two gradiometer-detectors 2 and 3, the difference between their outputs remains unchanged by reason of having used the feedback coils 7. This in effect transfers the severe balance requirements from the gradiometer unit to the feedback or neutralizing coils where they can be met much more easily.

In order to derive the maximum benefit from the feedback effect it is desirable that the feedback coils 7, 7 surrounding the gradiometer-magnetometers 2 and 3 should contain a sufficient number of turns to effectively reduce the field in these elements to zero when the field detector unit is placed in a perfectly uniform field. It is obvious that the number of turns in the feedback coil 7 surrounding the average field magnetometer 4 cannot be equal to nor as large as the number of turns in the feedback coils surrounding the gradiometer magnetometers 2 and 3 for if the number of turns were equal it would be impossible for the feedback circuit to reduce the field in the two gradiometer-magntometers 2 and 3 to zero. In actual practice it has been found desirable in one embodiment of the invention to use 1.2 percent more turns per inch in the feedback coils 7, 7 around the gradiometer-magnetometers 2 and 3 than are used in the feedback coil 7 around the average field magnetometer 4.

To fix more firmly in mind the operation of the gradiometer system disclosed in FIG. 1, its operation may be reviewed very briefly. Current of fundamental frequency from the 1 kilocycle oscillator 8 is passed through the band-pass filter 9 to energize the three magnetometers 2, 3 and 4, magnetometers 2 and 3 comprising the gradiometer-magnetometers and magnetometer 4 being responsive to the average field. In a field of uniform intensity, the second harmonic voltage outputs from the gradiometer-magnetometers 2 and 3 are equal and since they are in phase opposition, the net voltage appearing across conductors 20 and 21 will be zero so that gradient indicator 27 will indicate zero. Should, however, a field gradient exist between the elements 2 and 3, these generated second harmonic voltages will be unequal resulting in a current of second harmonic frequency passing through the primary of transformer 23. The voltage in the secondary of transformer 23 responsive to this second harmonic current in the primary will be filtered by filter 24, amplified by amplifier 25, rectified by rectifier 26 and indicated by the gradient indicator 27. The indicator may be calibrated in suitable units as, for example, gamma per foot.

By reason of its location the second harmonic voltage output of magnetometer 4 is proportional to the average field existing between the gradiometer-magnetometers 2 and 3. This second harmonic output is filtered by filter 28, amplified by amplifier 29, rectified by rectifier 30 and the resulting direct current which is proportional to the average field is indicated by the average field indicator 31. This same current passes through the three feedback coils 7, 7, 7 surrounding the three magetometer elements. In a field of uniform intensity the feedback is such as to reduce the component of field in the gradiometer-magnetometers 2 and 3 to zero. In order to produce this current, however, the magnetomotive force generated in the feedback coil 7 surrounding the average field detector 4 is less than around the two gradiometer coils thereby leaving a small residuum of field in the average field detector. In a field of unequal intensity where a gradient exists between the gradiometer units 2 and 3 the compensating feedback supplied by the feedback coils 7, 7 surrounding the gradiometer units 2 and 3 is still maintained rigorously equal for these two elements. Consequently the neutralizing or feedback coils do not affect in any way the difference between the second harmonic outputs of these two magnetometers created by the difference in the fields between them.

As previously stated in connection with FIG. 1 the gradiometer-indicator 27 is responsive only to the absolute magnitude of the axial component of field gradient and gives no indication whatever of the algebraic sign of this gradient. In order to provide an indication of the algebraic sign of the field gradient it is necessary to use a detection circuit which is also sensitive to the phase of the unbalanced opposition voltage created in the coils 6, 6 of the gradiometer units 2 and 3. Circuits capable of performing this function are shown in block schematic form in FIG. 2. In this figure corresponding parts of the same apparatus bear the same reference numerals as FIG. 1. The field detector unit 1 is substantially identical to the one shown in FIG. 1 with the single exception, however, that an additional adjusting coil 7' is shown connected in series with the feedback coils 7, 7, 7. The purpose of this adjusting coil is to aid in bringing to exact equality the feedback magnetomotive forces acting in the two end magnetometer elements 2 and 3. This adjusting coil comprises a few turns of wire which may not only be varied as to its number of turns but also it may be turned end for end so as to reverse its magnetomotive force. This adjusting coil is then mounted adjacent the end of one of the end feedback coils as, for example, the upper one shown in FIG. 2 and adjusted until the two feedback coils have equal feedback magnetomotive forces.

The exciting pick-up coils 6, 6, 6 of the three magnetometers 2, 3 and 4 are energized from a source of fundamental frequency 8 which is filtered by a band-pass filter 9' and transmitted to these windings by way of conductors 14, 15, 16, 20, 21 and 22. This is substantially identical with the arrangement shown in FIG. 1. However, in order to cause the circuit to respond to a phase reversal in the resultant second harmonic voltages generated by the magnetometers 2 and 3 it is necessary to compare this phase with some reference voltage of the same frequency. Also referring again for the moment to FIG. 1 it will be noted that the direct current providing the feedback will not reverse in sign even though the field detector unit 1 is reversed with respect to the field being measured. While this makes no difference where the apparatus is to be used in a fixed location it is intolerable where the apparatus is to be flown in an airplane and the direction of the principal axis of the field detection unit 1 would be constantly changing. Consequently, not only must the apparatus indicate the phase reversals of the detected second order harmonic voltages from the gradiometer-magnetometers 2 and 3 but the feedback magnetomotive force must also reverse when the field detector unit is reversed in its alignment with the field.

While balancing or polarizing means may be employed to achieve these objectives it is preferable that they be achieved by means of some type of phase modulator as, for example, the phase modulators 32 and 33 shown in FIG. 2. Phase modulators of this general type are well known in the art and require no detailed description. Briefly, however, they may be described as comprising a two-coil transformer 34 with a center tap secondary connected in balanced relation with two diodes 38 which may be included in a single envelope. The common leg of the balanced network includes a transformer 36 and the output circuit comprises a center-tapped resistor or potentiometer 40. If voltages of the same frequency are applied to the primaries of transformers 34 and 36 the output direct current voltage across the center-tapped resistor 40 will vary in magnitude and polarity in proportion to the magnitudes of these voltages and the phase angle existing between them. This description of the phase modulator 32 applies equally to the phase modulator 33.

The circuits for energizing the gradiometer-magnetometers 2 and 3 have already been described as being substantially identical with those previously described in connection with FIG. 1. However, the detection circuit for the second harmonic voltages is slightly different from that of FIG. 1. In FIG. 2 the resultant second harmonic voltage appearing across conductors 20 and 21 is fed into a bridge network comprising the end elements 42, 43 of the band-pass filter 9′, the reactors 45 and 46, the reactors 49 and 50 and the potentiometers 51 and 52. The end sections 42 and 43 of the bandpass filter 9′ provide a low impedance path to ground for the second harmonic currents and consequently terminals 10 and 11 may be regarded as being effectively grounded for voltages of second harmonic frequency. Thus in effect the second harmonic current generated in the coil 6 of gradiometer-magnetometer 2 is confined to a series circuit beginning with ground through this coil 6 of magnetometer 2, line 20, reactor 49 and potentiometer 51, reactor 45 and phase adjusting resistor 48, conductor 14 to ground through the end filter element 42.

Similarly, the second harmonic current generated in the exciting winding of magnetometer 3 is confined to a series circuit starting from ground through this pick-up winding 6 of magnetometer 3, conductor 21, reactor 50 and potentiometer 52, reactor 46 and back to ground through the end filter element 43. It is obvious therefore that if the field detector unit is in a uniform field and the magnetometers 2 and 3 are electrically identical so that their generated second harmonic voltages are equal the potentiometers 51 and 52 may be adjusted so that the voltage appearing across the primary windings 53, 54 of transformer 23′ will be zero. It also will be evident that should there be a slight inequality in these voltages when in a uniform field that this inequality may be adjusted by adjusting either potentiometer 51 or 52.

In practice these potentiometers 51 and 52 are adjusted to cause the gradiometer-magnetometers 2 and 3 to effectively have equal outputs for equal field increments. Then the slight inequalities in residual magnetism existing between gradiometer-magnetometers 2 and 3 may be adjusted by means of potentiometer 56 which is supplied from a direct current source 58 through a high resistance 57. The adjustment of this potentiometer adjusts the relative amounts of direct current which may flow from battery 58 through the exciting windings 6, 6 of the gradiometer-magnetometers 2 and 3. These circuits may be traced from ground through battery 58, high resistance 57, potentiometer 56 where the current divides, part of it going through winding 53, through potentiometer 51, conductor 20 to the coil 6 of gradiometer-magnetometer 2 and back to the battery 58 through ground. The divided current from potentiometer 56 passes through winding 54 and follows a similar path through potentiometer 52, conductor 21, the exciting winding 6 of gradiometer-magnetometer 3 and back to the source 58 through ground. This direct current flowing through the exciting windings of the magnetometers 2 and 3 produces a magnetomotive force which may be used to further balance out inaccuracies in construction and may be used to bring the indication of the gradient indicator or recorder 27 to zero when the field detector unit 1 is in a uniform field.

When all of the adjustments for balance are made so that when the field detector unit 1 is in a uniform field, the voltage appearing across the primary windings 53 and 54 is zero. Then should the field become non-uniform so as to present a magnetic gradient between the two magnetometers 2 and 3, this voltge across the primaries 53 and 54 will obviously become unequal and the phase of this voltage will depend upon the direction of the gradient effecting the two gradient-magnetometers 2 and 3. The two primary windings 53 and 54 are connected together through a capacitor as shown in FIG. 2.

The secondary winding 55 of transformer 23′ is connected to a second harmonic filter 24 the output of which is amplified by a tuned amplifier 59 and applied to the primary winding of transformer 34 in the phase modulator 32. In order to properly operate the phase modulator 32 it is necessary to have a reference voltage of the same frequency and of fixed phase applied to the primary of transformer 36. It is practically necessary that this voltage be derived from or closely synchronized with the same source that is used to energize the gradient magnetometers 2 and 3. In FIG. 2 this is done by connecting a frequency doubler 64 to terminal 12 of the band-pass filter 9′. The output of this frequency doubler actually contains a large number of harmonics but the second harmonic is selected by a tuned circuit 65 and amplified by two amplifiers 66 and 67. The output of the amplifier 66 is substantially constant in magnitude and is applied to the primary of transformer 36 thereby providing the second harmonic reference voltage for modulator 32.

With the connections just described it will be evident that the direct current output voltage across the center-tapped poteniometer 40 will be proportional in magnitude to the magnitude of the second harmonic resultant voltage coming from the gradiometer-magnetometers 2 and 3 since it is a voltage proportional to this resultant voltage which is applied to the primary of transformer 34. Also it will be evident that should this voltage reverse in phase the polarity of the direct current voltage across potentiometer 40 also reverses in polarity. This direct current voltage from potentiometer 40 is amplified by a direct current amplifier 60 and indicated by a gradient indicator or recorder 27. This gradient indicator or recorder should be a center indicating or recording instrument so that with changes in polarity the indications will be on opposite sides of a mid-position. Consequently, this indicator or recorder 27 will indicate not only the magnitude of the field gradient but also its direction.

The average field gradiometer 4 develops a second harmonic voltage proportional to the magnitude of the average field and its polarity or phase will be controlled by the direction of the magnetic field component to be measured. This second harmonic voltage is transmitted over conductor 22 through inductor 47, conductor 16, and to ground through the end filter element 44 which is similar to elements 42 and 43. This second harmonic voltage therefore appears as a drop across inductor 47 and is applied through conductor 19 to the input circuits of a two-kilocycle filter 28. This filter is a band-pass filter permitting the passage only of the second harmonic of two-kilocycles and the output of this filter is amplified by an alternating current amplifier 61 and applied to the primary winding of a transformer 35 which corresponds in function to the transformer 34 in the phase modulator 32. The phase modulator 33 acts in exactly the same manner as the phase modulator 32 and the reference voltage is derived from the same source through the amplifier 67 to the primary winding of transformer 37. The rectified output appears across the potentiometer 41 and is amplified by a direct current amplifier 62, the output of which is passed through the average field indicator 31 and the low-pass filter 63 to the feedback coils 7, 7, 7 in the field detector unit 1. By reason of the use of the phase modulator 33 this feedback current which is obtained from the direct current amplifier 62 reverses in polarity whenever the direction of the magnetic field to be measured reversed in sign. As previously stated this is the necessary requirement in order that the feedback magnetomotive force generated in the feedback coils 7, 7, 7 will have the proper direction to oppose the applied field. Since this current will reverse in sign the average field indicator 31 should be a center zero type instrument so that it will indicate the direction as well as the magnitude of the field to be measured.

FIGS. 3 and 4 taken together show in greater detail the various circuits shown in block form in FIG. 2. The oscillator 8 is shown in FIG. 3 and comprises tubes 70 and 71 connected in balanced relation, the circuits themselves being substantially identical with those disclosed in British Patent 149,018 to Eccles-Jordon, complete accepted August 12, 1920. The output of this oscillator may be coupled to the band-pass filter 9' through a balanced power amplifier 72, 73 and transformer 74. These circuits are entirely conventional and require no detailed description. The band-pass filter 9' is of the three-channel type having its output end sections of the form shown in FIG. 2. The connections from this band-pass filter to the field detector unit 1 are shown substantially as they appear in FIG. 2 and the corresponding parts in these two figures bear the same reference numerals. The second harmonic output from the secondary 55 of transformer 23' is connected to the input circuit of band-pass filter 24 in FIG. 4 through section 75A of the multiposition field switch 75. This circuit may be traced from the upper end of secondary 55 down through the upper deck 75A of the multiposition switch 75, through the brush of this switch to the input terminals of filter 24 in FIG. 4. The output of this band-pass filter 24 is connected to a tuned amplifier 59 which is shown in FIG. 4 as having two stages of amplification interconnected in a conventional manner with a tuned network. The output of this amplifier is connected to the primary of transformer 34 in the phase modulator 32 just as shown in FIG. 2. The output of the phase modulator is taken from across the potentiometer 40 and is applied to the input circuit 80 of the direct current amplifier 60. The output of this direct current amplifier is taken from across its cathode circuit resistors by way of conductors 68 to switch desk 75D and 75E of the multiposition switch 75 in FIG. 3. From the brushes of these two decks the circuit is carried to the gradient indicator or recorder 27. An alternating current output is also taken from the plate circuit of this amplifier for test purposes. This output is taken from transformer 76 to a telephone receiver 69, the purpose for which will be explained in more detail later.

The frequency doubler 64 of FIG. 4 has its input circuit coupled through conductor 86 and inductor 47 to the output terminal 12 of the band-pass filter 9' in FIG. 3. This frequency doubler is of the type wherein the bias resistance is adjusted to the point where a maximum amount of second harmonic energy is obtained from the plate circuit. This second harmonic energy is coupled to the input circuits of amplifiers 66 and 67 through the tuned interstage network 65. Amplifiers 66 and 67 are simple amplifiers whose output circuits are connected to the primaries of transformers 36 and 37, respectively. These transformers are connected in the common leg of the phase modulators 32 and 33 as was described in connection with FIG. 2.

The direct current output from phase modulator 33 is coupled to the input circuit of a direct current amplifier 62 through a low-pass filter network 78. In FIG. 2 this low-pass filter network 78 is regarded as part of the input circuits of direct current amplifier 62. The output from the direct current amplifier 62 is taken from across the cathode circuit resistors by way of conductors 77 in FIG. 4 to the low-pass filter network 63 in FIG. 3. This circuit also includes in series therewith the average field indicator 31. These circuits are substantially identical with those previously described in connection with FIG. 2.

The apparatus as thus far described in connection with FIGS. 2, 3 and 4 may be adjusted and operated as follows: With the power all turned on and the tubes permitted sufficient time to warm up and become stabilized the field switch 75 shown in FIG. 3 should be set to the +B position. In this position it will be noted that one of the leads from the gradient indicator or recorder 27 is connected to ground through the switch deck 75E of the field switch and a resistor, while the other terminal is connected through switch deck 75D, resistors 82 and 83 and a choke 84 to the positive terminal of the power supply unit which is schematically illustrated in FIG. 3 as a battery B. In this position the gradient indicator or recorder will indicate the voltage of the power supply source which, for proper operation should be adjusted, if necessary, to some predetermined voltage value. It will also be noted that at this position the switch deck 75B places ground on the control grid of the second stage of the alternating current amplifier 61 thereby reducing to zero the feedback current through the feedback coils 7, 7, 7 of the field detector unit 1. The brush of the switch deck 75A also places ground on the input terminals of the band-pass filter 24 so that there will be no input to the tuned amplifier 59 and phase modulator 32. Since there is no transmission through the alternating current amplifier 61 by reason of having the control grid of the second stage grounded there is no alternating current input to the primary of transformer 35 of phase modulator 33 and consequently the average field indicator 31 should read 0. Proper balance is accomplished by adjusting the slider of potentiometer 41 until meter 31 reads 0.

The field control switch should then be set at position GR which is the position normaly used for making the gradiometer measurement. The scale switch found in the grid circuit of the second stage of the tuned amplifier 59 as shown in FIG. 4 should then be placed to the point of maximum sensitivity, that is, to its upper contact as shown in FIG. 4. With these adjustments the gradiometer-indicator 27 should be adjusted to read zero by adjusting the potentiometer 56. As previously stated this potentiometer adjusts the relative amount of direct current which may be applied to the two gradiometer detector magnetometers 2 and 3. The scale switch should then be adjusted to minimum sensitivity, that is, to its lowermost contact and potentiometer 40 located in the phase modulator 32 should be adjusted to give a zero reading on the gradiometer-indicator 27. Potentiometer 80 in the direct current amplifier 60 should next be adjusted to give minimum tone in the telephone receiver 69. This potentiometer 80 is fed by some 1000-cycle energy from terminal 12 of the band-pass filter 9' in FIG. 3 by way of conductors 85, 86 and 87. This tends to balance out the alternating current component in the direct current amplifier 60. The scale switch in amplifier 59 may then be returned to maximum sensitivity, that is, its upper contact. Readjustment of potentiometer 56 may now be necessary to bring the two gradiometer-magnetometers 2 and 3 to more perfect balance.

The apparatus may be calibrated for a predetermined field gradient by applying a known field gradient to the field detector unit 1 and observing the response of the gradient indicator 27. Special circuits, however, are provided in the apparatus disclosed for artificially producing the known field gradient. This comprises unbalancing the amount of direct current applied to the exciting windings 6, 6 of the two gradiometer-magnetometers 2 and 3. The standardization or calibration is effected by first adjusting the field switch to the position +B and noting the reading of the gradiometer-indicator, then the field switch is placed on its position "CAL" which is the calibrate position. It will be noted that in this latter position the circuits are identical with the circuit set up with the switch at the GR position for normal operation except that switch deck 75C connects an additional resistor 88 into a network comprising resistors 89, 90, 57 and potentiometer 56. The magnitudes of these resistors are all selected to be of such size as to place a predetermined amount of unbalance direct current in the gradiometer-magnetometers 2 and 3 thus artificially producing a known field gradient as, for example, about 22 gamma per foot. In order that the gradiometer-indicator 27 will be reading properly for this known field, the rheostat 79 in the cathode circuit of the second stage of amplifier 59 shown in FIG. 4 should be adjusted until the gradiometer-indicator 27 reads the same as the reading noted when the field switch was on position +B. It is obvious that other means may be employed to standardize or calibrate the gradiometer-indicator. However, the one herein disclosed is self-contained and easily used.

The field switch should be returned to its GR position which is its position for normal operation. The gradiometer-detector should then be oriented into a substantially uniform field having a large component of not less than 0.2 gauss in the direction of the principal axis of the detector unit 1. This may be observed by observing the reading of the average field indicator which may be calibrated in terms of gauss. While in this position the field switch should be adjusted to the position F1 and rheostat 81, located in the cathode circuit of the first stage of amplifier 61, adjusted until a minimum reading is observed on the gradiometer-indicator 27. This adjusts the feedback current through the feedback coils 7 in the field detector unit 1 so that the net field in radiometer-element 3 is reduced to zero.

The field switch should then be placed on the GR position and with the field detector unit still oriented into a large axial field of at least 0.2 gauss, potentiometer 51 shown in FIG. 3 should be adjusted to give a minimum change in reading on the gradient indicator 27 when the field switch is switched from position GR to position CHK. It will be noted that with the field switch on position CHK the circuits are identical to those set up when the field switch is on position GR with the single exception that the switch deck 75B connects the grid of the second stage of amplifier 61 to terminal 90 instead of terminal 89 of the resistance network 91, 92 shown in amplifier 61 of FIG. 4. This obviously reduces the gain of the feedback amplifier so as to add a predetermined amount of the ambient magnetic field to each magnetometer. The adjustment of potentiometer 51 adjusts the gradiometer-magnetometers 2 and 3 so that they have equal sensitivities for equal field increments.

The next step in the adjustment procedure is to adjust the gradiometer-magnetometer elements 2 and 3 so that their principal axes are in exact alignment or at least parallel and in substantial collinearity. It should be noted that in general the primary requirement is that the two gradiometer-magnetometer axes be parallel with each other and if the gradient in a direction parallel with a line joining the magnetic centers of the two gradiometer-magnetometers is to be measured these two magnetometers should be in substantial collinearity. From all of the foregoing description it will be obvious that if the gradient is to be measured of a field at an angle, for example at a right angle, with a line joining the magnetic center of the two gradiometer-magnetometers it is only necessary to rotate these magnetometers out of substantial collinearity by the desired angle but retaining their parallel relationship. Thus the same structure and circuit hereinbefore described will measure a traverse gradient by simply rotating the two gradiometer-magnetometers through the desired transverse angle. To maintain the full advantages of the feedback arrangement it is also desirable that the feedback, or average field magnetometer 4, also be adjusted parallel with the gradiometer-magnetometers 2 and 3 and preferably its axis should lie in the plane defined by their axes. Regardless of what this angle is the apparatus functions in precisely the same manner and is not limited to any particular fixed angle. One of the most useful cases is where the angle is substantially zero which condition is realized by adjusting the magnetometer axes into substantial collinearity. This is accomplished by replacing the field switch 75 on position GR and with the scale switch in amplifier 59 at its point of maximum sensitivity, the field detector unit 1 should be rotated into zero field, that is, 90 degrees with respect to the direction of the ambient field. This position may be determined by observing the reading of the average field indicator 31 which should read 0 in this position. It should be understood that in this position the average field indicator 31 will read 0 when the average field magnetometer 4 has its principal axis perpendicular with the ambient field and the problem is to align the gradiometer-magnetometers 2 and 3 so their principal axes are likewise perpendicular to the ambient field. This is accomplished by mechanically adjusting the alignment of the gradiometer-magnetometer elements 2 and 3 until the entire field detector unit 1 may be rotated about its own axis without any variation in the reading of the gradient indicator 27. The mechanical means for making this adjustment will be described in greater particularity later in connection with FIGS. 5 to 8, inclusive.

Any inequality in the feedback fields produced by the feedback coils 7, 7 surrounding the gradiometer-detector elements 2 and 3 may be observed by orienting the field detector unit 1 into alignment with the direction of the ambient field so that the average field indicator reads at least about 0.2 gauss. With the field switch 75 on its gradiometer position GR and with the scale switch at its point of maximum sensitivity the field detector unit 1 should be reversed end for end. If there is any change in the gradiometer reading from one position to the other this will be compensated for by changing the adjustment of the adjustment coil 7'. This adjustment is made by simply either turning the adjusting coil 7' over or by changing its number of turns whichever is necessary. Sometimes both of these adjustments are necessary.

With the apparatus adjusted as just described and with the field switch 75 on the position GR the apparatus is ready for the measurement of field gradients. The average field indicator 31 will indicate the strength of the average field along the direction of the principal axis of the field detector unit 1, while the gradient indicator or recorder 27 will indicate the gradient existing along the same axis between the gradient-magnetometers 2 and 3.

The magnetometer elements 2, 3 and 4 may be mounted in any type of supporting structure which preferably has some means of adjusting the alignment of the end elements. One such means disclosing a preferred form for supporting the elements in substantial collinearity is shown in FIGS. 5 to 8, inclusive. FIG. 5 shows an end view of the housing for supporting these magnetometer elements. FIGS. 6A and 6B disclose a section view through FIG. 5. In FIGS. 6A and 6B the three magnetometer elements 2, 3 and 4 are shown mounted within a rigid tube of non-magnetic material 93. These magnetometers are spaced a fixed distance apart determined by two spacers 94, 94. Supporting tube 93 is in turn supported within another rigid tube 95 and spaced therefrom by means of three spacers 96, 96, 96. As the three magnetometers are substantially identical in their construction the cross-section view of the magnetometer 2 shown in FIG. 6A is illustrative of all three.

It will be noted that the section view of magnetometer 2 in FIG. 6A shows the core of magnetic material 5 in dotted outline and surrounded by the exciting winding 6 which, although it is shown in two sections, may be wound only in one section or in more than two. The winding 6 is placed upon a non-conductive, non-magnetic spool 98 within which the magnetic core 5 is securely retained. This spool is then placed within a tube of insulating material 99 to which is firmly attached two spoolheads 100, 100. These spoolheads have an outside diameter sufficient to cause them to fit snugly within the supporting tube 93 and contain around their periphery a series of slots 101 which lends flexibility to the spoolheads to insure secure contact with the inner surface of the supporting tube 93. The feedback coil 7 is wound around the insulating tube 99. The electrical connections for these magnetometers are not shown in these figures but the connections are brought through the spoolheads and out through a cable connection 102 shown at the right end of FIG. 6B. These connections are made in accordance with FIGS. 1, 2, 3 and 4 already described.

In order to prevent the entrance of moisture into the gradiometer assembly end caps 103 and 104 are provided for the ends of the outer supporting tube 95. A desiccant may also be used to insure dryness inside the enclosure. These end caps contain plugs 105 and 106 respectively which may be removed in order to permit the entry of a screw-driver for adjusting the alignment of the two gradiometer-magnetometers 2 and 3. The holes containing these plugs 105 and 106 are placed opposite two adjustment screws 107 and 108 which are engaged by the screwdriver in making the alignment adjustment. As this mechanical adjustment requires flexibility in the vicinity of the end elements it is necessary that the inner supporting tube 93 be made somewhat flexible at its ends. This is accomplished by a series of longitudinal slots 97 which are cut in the ends of the supporting tube 93 of length substantially coextensive with the length of the magnetometer elements. The adjustments are effected by adjusting screws 109 and 110. Screws 109, of which there are two diametrically opposed in each of the ends, are threaded directly in a non-magnetic block 111. In FIG. 6B it is obvious that by the adjustment of screws 109 the right end of magnetometer 3 may be moved vertically so as to change the axial alignment thereof with respect to the average field magnetometer 4. In FIG. 6A the adjustment screws 109 are horizontal and consequently the adjustment of these screws will adjust the horizontal alignment of the magnetometer 2 with respect to the average field magnetometer 4.

The adjustment screws 110 are not threaded directly in the block 111 but rather are they threaded into a worm gear 112 best shown in FIGS. 7 and 8. This worm gear is rotated by means of a worm 113, also shown in FIG. 7. The end of the shaft for worm 113 is slotted to receive a screw-driver as shown at 107 in FIG. 7 and also by the same reference numeral in FIG. 6A. It is to be understood that the mechanical construction of this adjustment is identical for each end, that is to say, the adjustment screw 108 operates upon adjustment screw 110 in FIG. 6B in just the same manner as adjustment screw 107 operates the adjustment screw 110 in FIG. 6A.

In FIG. 7 the adjustment screws 109, 109 are threaded into block 111 as shown in the cut-away view on the left side. When these screws are properly adjusted they may be keyed in place by means of pins 115 or by any other convenient means of locking the screws 109 against turning. In FIG. 8 the referred construction for the adjustment screw 110 is more clearly observed. It will be noted that screw 110 is threaded internally to receive a similar external thread 114 on the rod 110'. The threaded portion 114 is also long enough to include the worm gear 112 which is also threaded internally to take this same thread. Longitudinal slots 116 are cut in rod 110A throughout a substantial portion of the threaded part 114 where it passes through the worm gear 112. Rod 110' also has a hole drilled centrally from its lower end. The exact construction of this hole need not be described in detail as this type of construction is well known and has been used for a number of years in expansion reamers. The purpose of the slot 116 and this hole is to permit a threaded plunger 118 to be turned down into this hole and to slightly expand the rod 110' under the worm gear 112 thereby eliminating any backlash. The upper portion of rod 110' is flattened as indicated clearly in FIGS. 7 and 8. These flats cooperate with a slot 119 cut in the end of the inner supporting tube 93 and serves to prevent the rotation of the shaft 110' when adjustments are being made by turning the worm gear 112. An adjustment sleeve 120 is threaded into block 111 and when properly adjusted prevents vertical motion of the worm gear 112 and consequently any vertical motion of the rod 110' and adjustment screw 110.

With the parts assembled as shown in FIG. 8 the adjustment sleeve 120 is brought down against the worm gear 112 to take up any vertical motion of the gear. Adjustment screw 110 is rotated so that its lower end bears against the inner surface of the outer supporting tube 95, while the upper end of rod 110' is similarly brought to bear against the inner surface of tube 95. Adjustment screw 110 may then be keyed against rotation with respect to the rod 110' by means of a pin 121. While this pin prevents the relative rotation between screw 110 and shaft 110' it does not prevent the vertical adjustment of this assembly with respect to block 111 by reason of a slot 122 milled into the ends of block 111. This slot 122 may be more easily observed in FIG. 7.

While it has been stated that it is desirable to accurately align the principal magnetic axes of gradiometer-magnetometers 2 and 3 in alignment with the principal magnetic axis of the average field magnetometer 4, it is very much more important to the gradiometer measurement that the principal axes of the gradiometer-magnetometers 2 and 3 be in exact alignment with each other, either in exact collinearity or in substantial collinearity with their principal axes parallel. Consequently, the alignment mechanisms for the two ends are mounted 90 degrees with respect to each other. The adjusting screws 109 at both ends are then adjusted as accurately as possible and keyed in place by the pins 115. Thereafter the adjustments may be made through the plugs 105, 106 by means of a screwdriver cooperating with the adjustment screws 107 and 108. These screws it will be remembered comprise a shaft with a worm which cooperates with the worm gear 112. Should a slight vertical misalignment exist in the magnetometer 3 of FIG. 6B the adjustment of the adjusting screw 107 of FIG. 6A can bring the principal axis of the gradiometer-magnetometer 2 into horizontal parallelism with the principal axis of gradiometer-magnetometer 3. Similarly, the adjustment of screw 108 in FIG. 6B will move the principal axis of the magnetometer 3 horizontally until it is in alignment with or until it lies in a vertical plane which is parallel to the vertical plane in which the principal axis of the gradiometer-magnetometer 2 lies.

What is claimed is:

A magnetic gradiometer system for measuring the gradient of a component of a magnetic field comprising three magnetometer elements each comprising a length of magnetic material with windings thereon, means supporting said magnetometers in figxed space relation with their principal axes aligned to substantial parallelism, a source of alternating current of fundamental frequency, circuits connecting said source to windings on all three magnetometers whereby even order harmonic voltages are generated in each of said windings of magnitudes proportional to the magnitude of the magnetic component in the direction of the respective principal axes, an alternating current bridge network including windings of two of the magnetometers and a plurality of impedance elements, a first circuit in said network comprising a winding of one of the two magnetometers and at least one of the impedance elements, a second circuit of said network comprising a winding of the other of said two magnetometers and at least one other of the impedance elements, a frequency and phase selective circuit connected to an impedance element in each of said first and second circuits, said selective circuit being responsive to the difference in magnitude and phase between only one of the even order harmonic voltages generated in each of the two magnetometers, an indicating means connected to said selective circuit whereby the indications thereof are proportional to the magnitude and direction of the field gradient existing between said two magnetometers, a second frequency and phase selective circuit including a rectifying means connected to the third magnetometer and adapted to produce an output direct current proportional in magnitude and polarity to the magnitude and phase of only one of the even order harmonic voltages generated in the third magnetometer, a circuit connecting said direct current output in series with at least one of the windings on each of said three magnetometers and in magnetic polarity to oppose at each magnetometer the magnetic field component to be measured.

References Cited in the file of this patent
UNITED STATES PATENTS

| | | |
|---|---|---|
| 2,379,716 | Hull | July 3, 1946 |
| 2,406,870 | Vacquier | Sept. 3, 1946 |